(12) United States Patent
Ahn et al.

(10) Patent No.: US 8,767,388 B2
(45) Date of Patent: Jul. 1, 2014

(54) SUPPORT ASSEMBLY AND COMPUTER DEVICE HAVING THE SAME

(75) Inventors: Jin-hyuk Ahn, Hwaseong-si (KR);
Young-sun Park, Yongin (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 320 days.

(21) Appl. No.: 13/242,384

(22) Filed: Sep. 23, 2011

(65) Prior Publication Data

US 2012/0099267 A1 Apr. 26, 2012

(30) Foreign Application Priority Data

Oct. 20, 2010 (KR) ......................... 10-2010-0102375

(51) Int. Cl.
*H05K 5/00* (2006.01)
*H05K 7/00* (2006.01)
*G06F 1/16* (2006.01)

(52) U.S. Cl.
CPC ............ *G06F 1/1632* (2013.01); *G06F 1/1626* (2013.01); *G06F 1/1601* (2013.01)
USPC ............... 361/679.41; 361/679.27; 361/679.3

(58) Field of Classification Search
CPC ....... G06F 1/16; G06F 1/1601; G06F 1/1626; G06F 1/1632; H02J 7/0042
USPC ............. 361/679.27, 679.41, 679.39, 679.42, 361/679.43, 679.44
See application file for complete search history.

(56) References Cited

U.S. PATENT DOCUMENTS

| | | | |
|---|---|---|---|
| 7,184,263 B1 * | 2/2007 | Maskatia ................. | 361/679.27 |
| 7,551,426 B2 * | 6/2009 | Huang et al. ............. | 361/679.02 |
| 7,652,879 B2 * | 1/2010 | Hartman et al. ......... | 361/679.39 |
| 7,925,310 B2 * | 4/2011 | Chiu .......................... | 455/575.1 |
| 8,526,172 B2 * | 9/2013 | Dai et al. ................. | 361/679.07 |
| 2009/0147458 A1 * | 6/2009 | Wang et al. ............. | 361/679.27 |

FOREIGN PATENT DOCUMENTS

KR 10-2010-0083583 7/2010

* cited by examiner

*Primary Examiner* — Anthony Haughton
(74) *Attorney, Agent, or Firm* — Stanzione & Kim, LLP (57) ABSTRACT

A support assembly that supports a device main body to be able to rotate includes a base member supported on an installation surface, a support unit having a predetermined curvature, coupled with the device main body on one side thereof, and reciprocating according to tilting of the device main body between an upright position and a tablet position, a guide rail coupled with the base member on a first side thereof and supported by the support unit on a second side thereof, to guide the reciprocation of the support unit, and an elastic unit connected to the support unit and providing an elastic force to maintain a tilting position of the device main body. A computer device may include the support assembly. The support assembly may support a computer device main body having a display when the computer device main body tilts between the upright position and the tablet position.

20 Claims, 9 Drawing Sheets

SUPPORT ASSEMBLY AND COMPUTER DEVICE HAVING THE SAME

CROSS-REFERENCE TO RELATED APPLICATIONS

This application claims priority under 35 U.S.C. §119(a) from Korean Patent Application No. 10-2010-0102375, filed on Oct. 20, 2010 in the Korean Intellectual Property Office, the disclosure of which is incorporated herein by reference.

BACKGROUND OF THE INVENTION

1. Field of the Invention

The present general inventive concept relates to a support assembly and a computer device having the same, and more particularly, to a support assembly which supports a device main body to be able to rotate and a computer device having the same.

2. Description of the Related Art

A computer device generally has a central processing unit (CPU) to control one or more functions of the computer device, a memory to store data, and a main board which is mounted with optional boards such as a graphic card and a sound card to support the CPU to perform image processing and audio processing and allows a variety of applications to be executed in an operating system. The computer device may be realized in a variety of types. For example, in addition to a desk-top and a lap-top which have been widely used, a pad type computer device has recently been developed and marketed to consumers. The pad type computer device includes a device main body, where the CPU, the memory, the main board, and a display panel to display one or more images are mounted inside a single housing.

The pad type computer device includes a device main body generally has a rectangular plate shape in which a display panel to display one more images is installed on a front side thereof, and a support assembly which supports the device main body in a specific tilting range so that the display panel may maintain a predetermined tilting angle with respect to an installation surface.

A support assembly in the related art has a configuration in which a hinge shaft is installed on a rear side of the device main body and the device main body is tilted around the hinge shaft. Thus, a stand coupled with the device main body through the hinge shaft may interfere with the device main body when the device main body is tilted, thereby restricting a tilting range of the device main body.

On the other hand, the pad type computer device may be additionally provided with a touch screen in the display panel area to be used in a tablet position. In this case, it is preferable that the display panel is disposed in parallel with the installation surface for efficient use. However, due to its restricted tilting range, it is difficult for the support assembly in the related art to support the tilting of the device main body at a desired angle corresponding to both an upright position in which the device main body stands on the installation surface and the tablet position.

SUMMARY OF THE INVENTION

Accordingly, at least one feature and utility of the exemplary embodiments is to provide a support assembly which may support a device main body at a tilting range between an upright position and a tablet position, and a computer device having the same.

Additional features and utilities of the present general inventive concept will be set forth in part in the description which follows and, in part, will be obvious from the description, or may be learned by practice of the general inventive concept.

The foregoing and/or other features and utilities may be achieved by providing a support assembly which supports a computer device main body having a display section, including a base member which is supported on an installation surface, a support unit having a predetermined curvature, which is coupled with the computer device main body on one side thereof, and reciprocates according to a tilting movement of the computer device main body between an upright position in which the computer device main body stands upright with respect to the installation surface and a tablet position in which the computer device main body is disposed in parallel with the installation surface, a guide rail which is coupled with the base member on a first side thereof and is supported by a part of the support unit on a second side thereof, to guide the reciprocation of the support unit, and an elastic unit which is connected to the support unit and provides an elastic force to maintain a tilting position of the computer device main body when the computer device main body tilts between the upright position and the tablet position.

The elastic unit may include an elastic member which provides the elastic force to maintain the tilting position of the computer device main body, and a connection member which connects the support unit and the elastic member and provides a pressing force to the elastic member according to the reciprocation of the support unit.

The elastic member may provide the elastic force to the computer device main body toward the upright position to balance load of the computer device main body supported by the support unit.

The connection member may be provided in a pair to be coupled with opposite side end parts of the support unit, and the pair of connection members provides the pressing force in different directions according to the reciprocation of the support unit.

The elastic unit may further include roller parts which are respectively disposed adjacent to the opposite side end parts of the support unit and guide a reciprocal movement of the pair of connection members.

The guide rail may include a pair of first guide rails which is coupled with the base member on a first side thereof and is supported by opposite side end parts of the support unit on a second side thereof, and a pair of second guide rails which is respectively coupled with the pair of first guide rails with the support unit being disposed therebetween and guides the reciprocation of the support unit.

Sections of the first and second guide rails which contact the support unit may respectively have curvatures corresponding to the predetermined curvature of the support unit.

The guide rail may further include a guide roller which is disposed between the first guide rail and the second guide rail and guides the reciprocation of the support unit.

Rolling support parts may be respectively formed on the opposite side end parts of the support unit to rolling-contact the guide rollers.

A rotational center of the computer device main body may coincide with a curvature center of the support unit.

The base member may include a first base member, and a second base member which is disposed at a height lower than the first base member and on which the guide rail which guides the reciprocation of the support unit, and the elastic unit which provides the elastic force according to the reciprocation of the support unit are installed.

The computer device main body may have a rectangular plate shape in which the display section is installed on a front side thereof, and the height difference between the first base member and the second base member may be set so that upper surfaces of the first base member and the display section have substantially the same heights when the computer device main body is in the tablet position.

The foregoing and/or other features and utilities may be achieved by providing a computer device including a computer device main body in which a display section is installed on a front side thereof, and a support assembly, according to any one of the above configurations, which supports the computer device main body to be able to tilt with respect to the installation surface between the upright position and the tablet position.

According to such a configuration, the support assembly may support the device main body in a simplified manner so that the device main body may tilt between the upright position and the tablet position, corresponding to the upright position and the tablet position.

BRIEF DESCRIPTION OF THE DRAWINGS

The above and/or other features and utilities of the present general inventive concept will become apparent and more readily appreciated from the following description of the exemplary embodiments, taken in conjunction with the accompanying drawings, in which.

DETAILED DESCRIPTION OF THE PREFERRED EMBODIMENTS

Reference will now be made in detail to the exemplary embodiments of the present general inventive concept, examples of which are illustrated in the accompanying drawings, wherein like reference numerals refer to the like elements throughout. Exemplary embodiments are described below in order to explain the present general inventive concept while referring to the figures.

In this description, X, Y and Z directions are orthogonal to each other and represent a first horizontal direction, a second horizontal direction which is orthogonal to the first horizontal direction, and a vertical direction which is orthogonal to the first and second horizontal directions, respectively. In exemplary embodiments, a lower edge of a device main body which is supported by a support assembly is disposed along the X direction. Reverse directions to the X, Y and Z directions may be respectively represented as −X, −Y and −Z directions. An X-Y plane represents a plane formed by an X directional axis and a Y directional axis.

Figure 1:
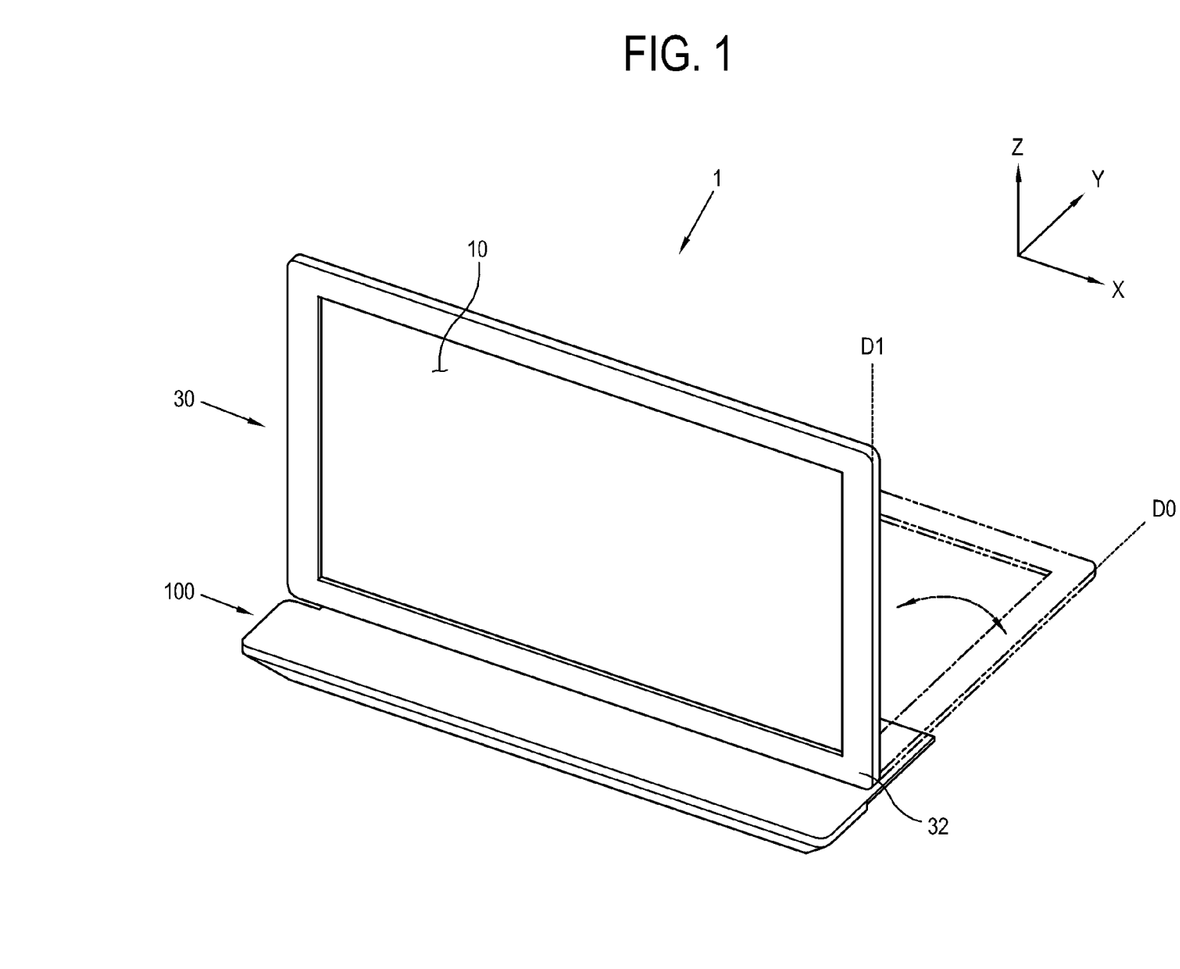
FIG. 1 is a perspective view illustrating a computer device according to an exemplary embodiment.
Figure 2:
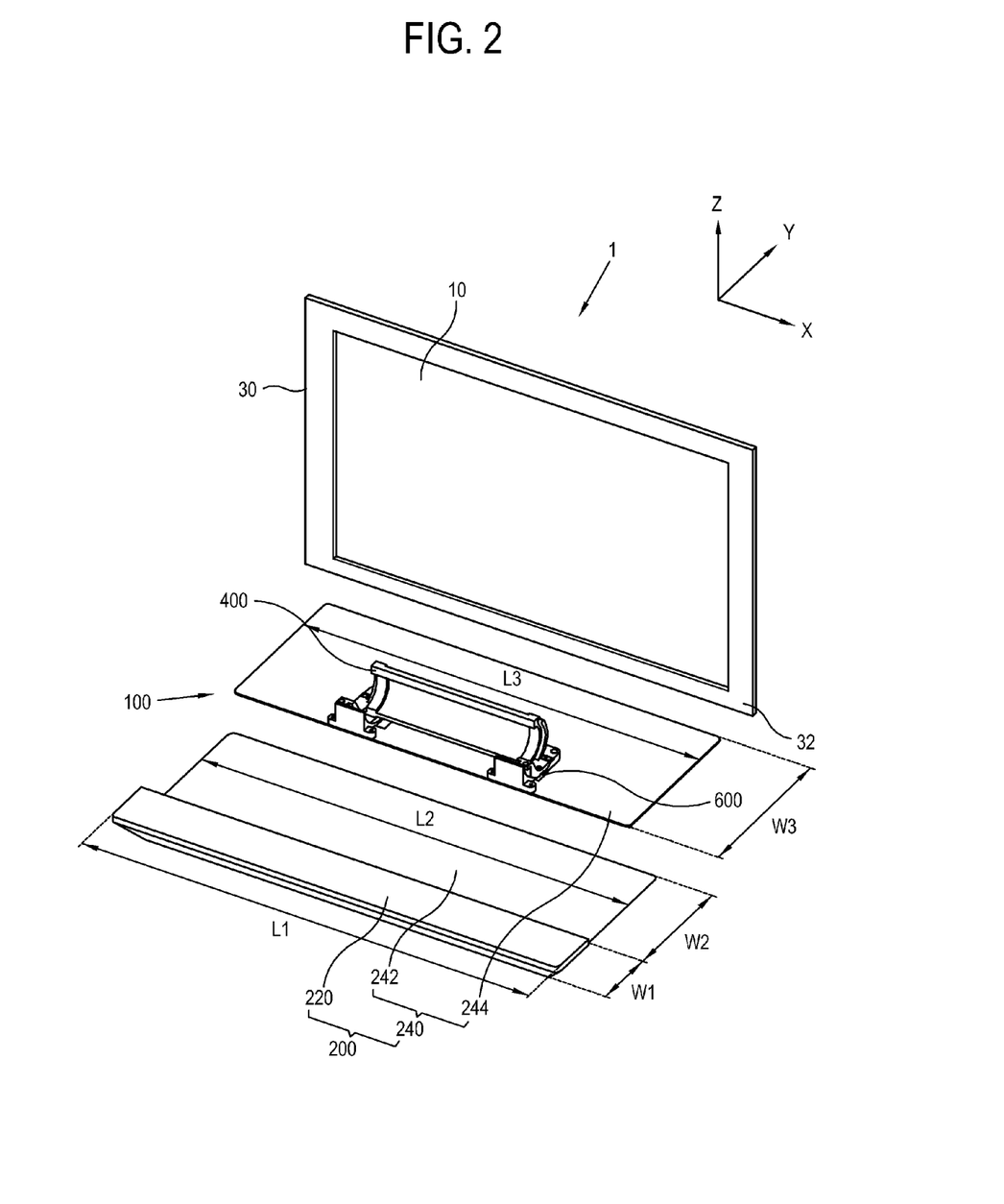
FIG. 2 is an exploded perspective view illustrating a computer device in FIG. 1.

FIG. 1 illustrates is a perspective view illustrating a computer device according to at least one exemplary embodiment, and FIG. 2 is an exploded perspective view illustrating the computer device shown in FIG. 1.

As shown in FIGS. 1 and 2, a computer device 1 according to at least one exemplary embodiment includes a device main body 30 and a support assembly 100.

The device main body 30 has a rectangular plate shape in which a display section 10 to display an image is installed on one side thereof. It is appreciated that the device main body 30 is not limited to a rectangular shape, and that the device main body 30 may be formed as various other shapes. The display section 10 may employ a variety of display devices, including but not limited to, a liquid crystal display (LCD) and an organic light emitting diode (OLED). Inside of the device main body 30 are accommodated a CPU (not shown), a memory (not shown) to store data, a graphic card (not shown) to process one or more images, a sound card (not shown) to process audio, a main board (not shown), a power supply (not shown), and other various components and/or control modules. These components may be installed on a rear side of the display section 10.

With this hardware configuration, the device main body 30 allows a variety of software applications to be executed in an operating system, to thereby perform a process desired by a user. The display section 10 of the device main body 30 may be realized as a touch screen. In this case, the device main body 30 may selectively operate in any one of an upright position in which the device main body 30 stands on an installation surface and a tablet position in which the device main body 30 is disposed in parallel with the installation surface. It is appreciated that the operation of the software applications may not be affected based on the position of the device main body 30.

When the device main body 30 is in the upright position to perform typical computer functions, the planar surface of the display section 10 may stand upright with respect to the installation surface, that is, the device main body 30 may be disposed in parallel with the Z directional axis, or may be disposed at a tilting angle with respect to the installation surface. In this position, a user may easily view an image displayed on the display section 10.

On the other hand, when the device main body 30 operates in the tablet position in which the user may easily touch the planar surface of the display section 10 directly, or may touch the display with a stylus pen to input desired selections an other information, the planar surface of the display section 10 is positioned in which the device main body 30 is disposed in parallel with the installation surface. That is, the device main body 30 is may be disposed in parallel with the X-Y plane. In this position, the user may easily touch the planar surface of the display section 10 to input user selections and other information.

The support assembly 100 supports the device main body 30, which may be tilted around the lower edge 32 thereof. That is, the device main body 30 may be tilted about the X directional axis, and between an angle D0 with respect to the installation surface in the tablet position and an angle D1 with respect to the installation surface in the upright position. Thus, the user may rotate the device main body 30 to the angle D0 in the tablet position, and may rotate the device main body 30 to the angle D1 or an angle between the angles D0 and D1 in the upright position. Moreover, the support assembly 100 supports the device main body 30 to maintain a tilting position. The tilting position of the device main body 30 exists between the upright position and the tablet position, i.e., where the device main body 30 is positioned at an angle between D0 and D1.

Figure 3:
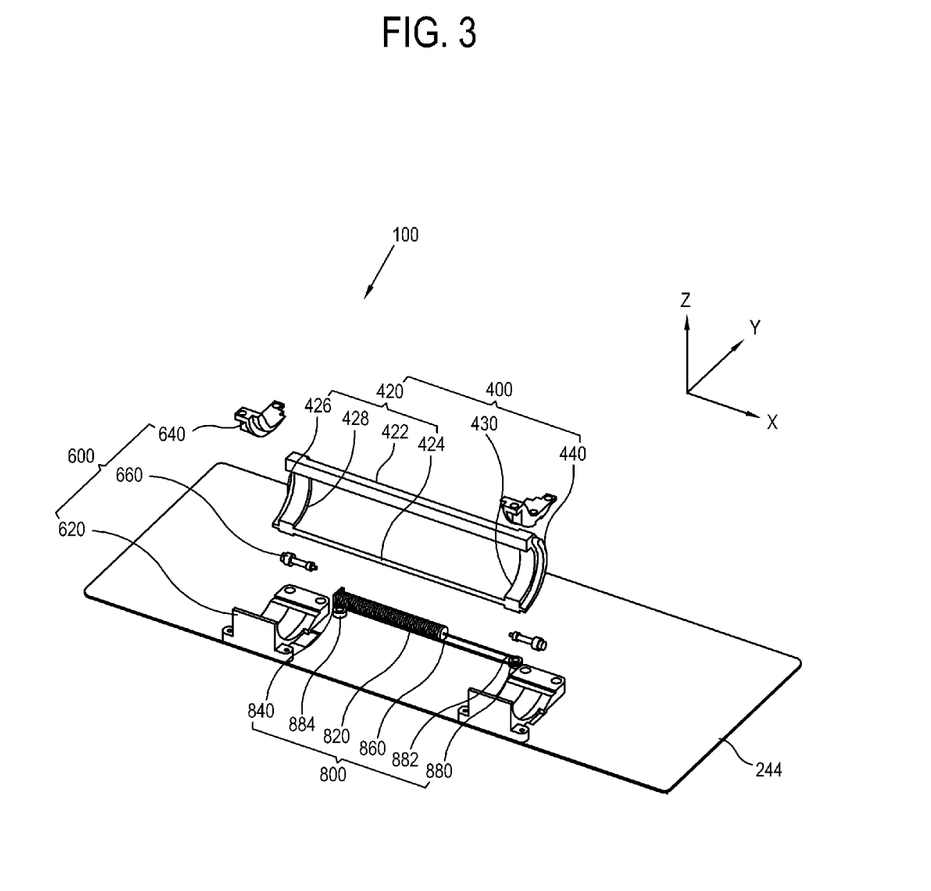
FIG. 3 is an exploded perspective view illustrating a support assembly in a computer device in FIG. 2.
Figure 4:
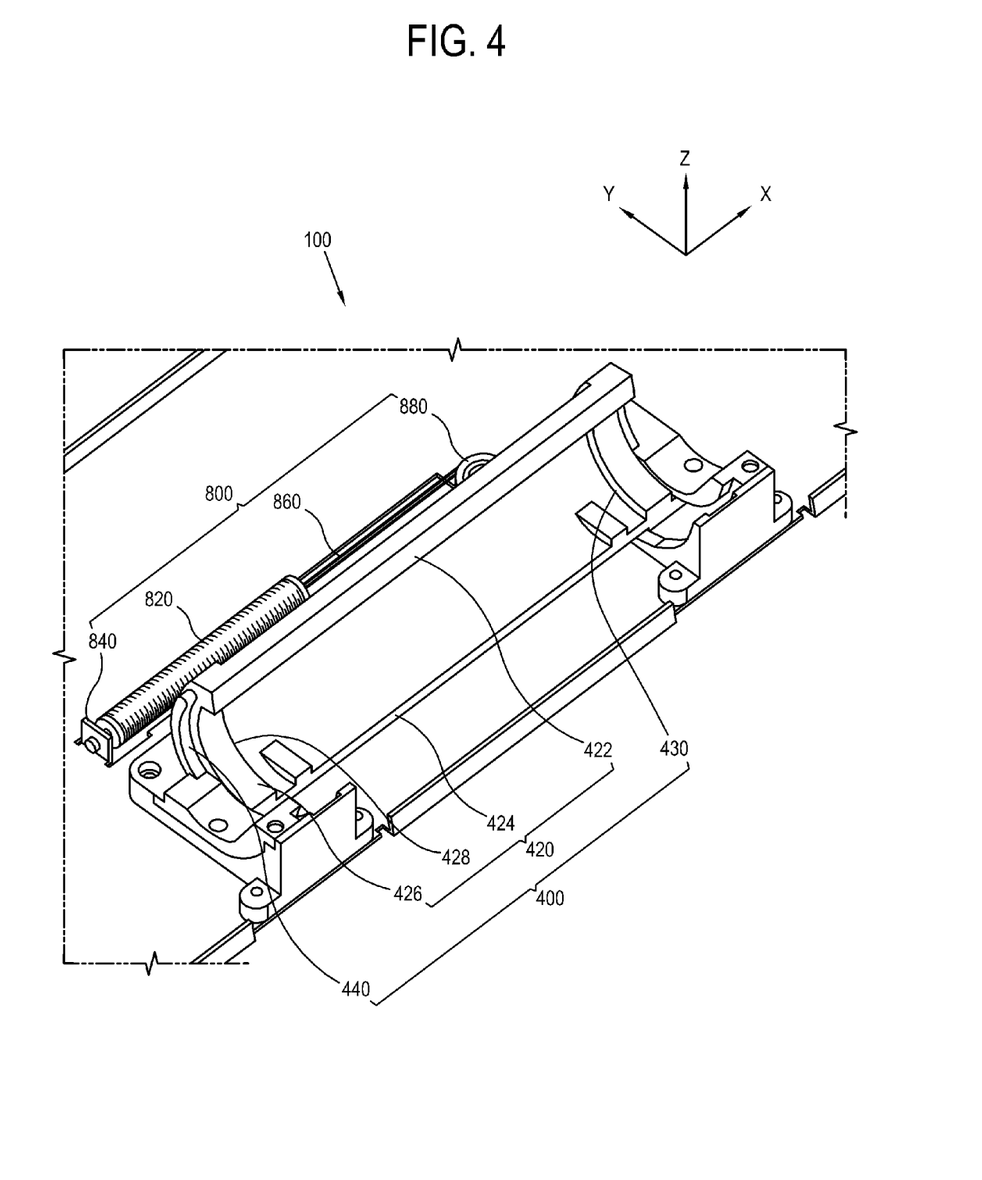
FIG. 4 is a perspective view illustrating a support assembly in a computer device according to an exemplary embodiment.
Figure 5:
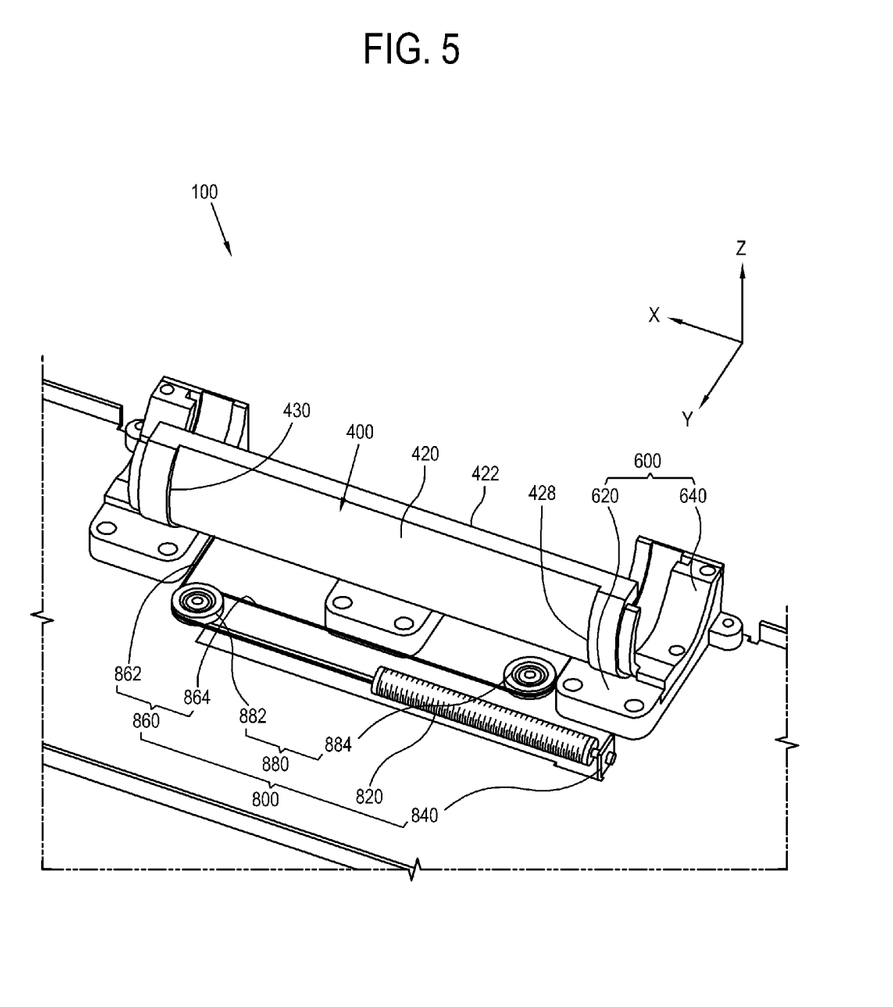
FIG. 5 is a rear perspective view illustrating a support assembly in FIG. 4.
Figure 6:
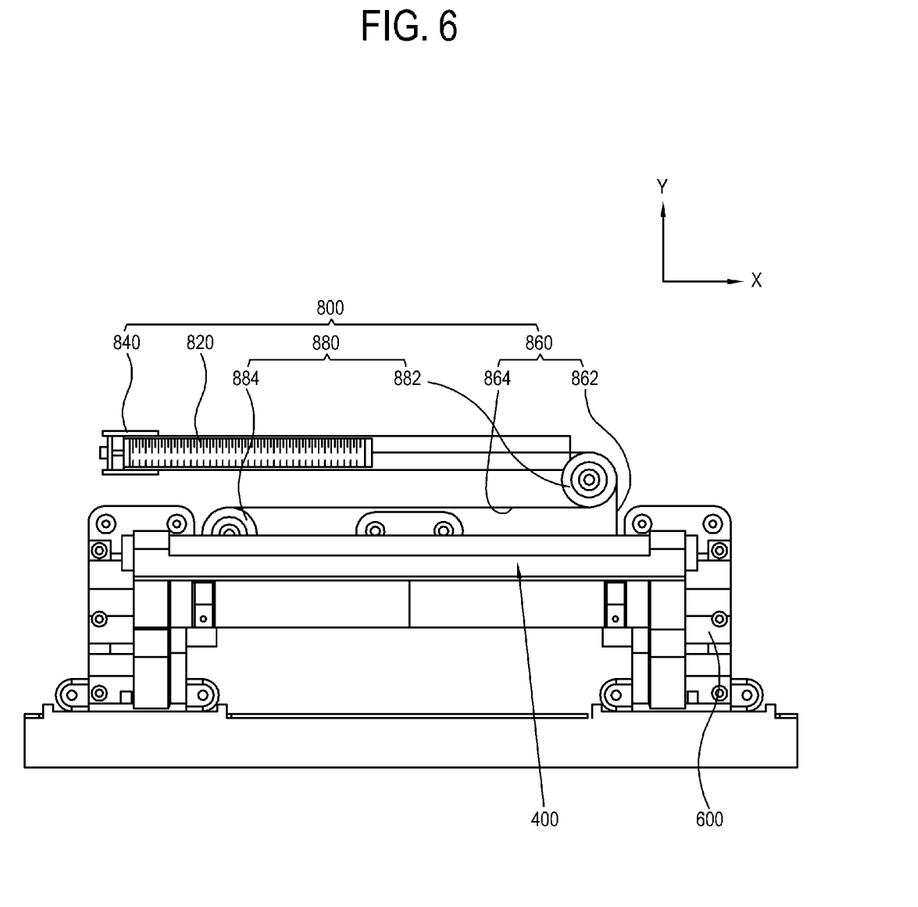
FIG. 6 is a plan view illustrating a support assembly in a computer device according to an exemplary embodiment.

FIG. 3 is an exploded perspective view illustrating the support assembly 100 in the computer device shown in FIG. 2; FIG. 4 is a perspective view illustrating the support assembly 100 in the computer device according to an exemplary embodiment; FIG. 5 is a rear perspective view illustrating the support assembly 100 shown in FIG. 4; and FIG. 6 is a plan view illustrating the support assembly 100 in the computer device according to an exemplary embodiment.

As shown in FIGS. 2 to 6, the support assembly 100 includes a base member 200, a support unit 400, a guide rail 600 and an elastic unit 800.

The base member 200 extends in parallel with the lower edge 32 of the device main body 30 along the X directional axis. The base member 200 may include a first base member 220 and a second base member 240. The first base member 220 has a length (L1) extending along the lower edge 32 of the device main body 30 in the X directional axis, and a width (w1) extending along the Y directional axis. The second base member 240 has a length (L2) extending along the X directional axis parallel with the length (L1) of the first base member, and a width (w2) extending along the Y directional axis. The width (w2) of the second base member 240 may be greater than the width (w1) of the first base member 220. The second base member 240 may also extend from the first base member 220 at a height lower than the first base member 220 and on which the guide rail 600 and the elastic unit 800 are mounted. For example, when the user is located in the −Y direction with respect to the device main body 30, the first base member 220 is disposed on the user side, and the second base member 240 is disposed on the Y directional side.

In a state where the base member 200 is supported on the installation surface, the height difference between upper surfaces of the first base member 220 and the second base member 240 may vary depending on design demands. For example, the height difference may be set so that the upper surfaces of the display section 10 and the first base member 220 have substantially the same heights to enhance usability in design of the computer device 1.

According to an exemplary embodiment, the second base member 240 may include a main base part 242 which extends from the first base member 220 at a height lower than the first base member 220, and a sub base part 244 which supports the guide rail 600 and the elastic unit 800. The sub base part 244 may have a length (L3) a width (w3) equal to the length (L1) and width (w1) of the first base member 220 such that the sub base part 244 may be fitted with the second base member 240. The sub base part 244 may be separable from the main base part 242, or may be fixedly attached thereto. Additionally, the guide rail 600 and the elastic unit 800 may be directly installed on the second base member 240, and in this case, the second base member 240 may not include the sub base part 244.

The support unit 400 includes a support body 420 and a rolling support part 440. The support body 420 may have a predetermined curvature and is coupled with the device main body 30 on one side thereof, as described in greater detail below. The support unit 400 reciprocates as the device main body 30 tilts between the upright position and the tablet position, i.e., between angle D0 and angle D1. That is, when the device main body 30 tilts between the upright position and the tablet position, the support unit 400 reciprocates along the guide rail 600 according to the tilting of the device main body 30. That is, the support body 420 rotates about a curvature center C (refer to FIGS. 7 to 9) in a reciprocating manner.

Here, a rotational center of the device main body 30 coincides with the curvature center C of the support body 420. Thus, when the device main body 30 tilts between the upright position and the tablet position, the load of the device main body 30 (e.g., the weight of the device main body 30) may be overcome by an elastic force of the elastic unit 800, to thereby maintain the tilting position of the device main body 30.

As mentioned above, the support body 420 may have a predetermined curvature with respect to the X direction axis. For example, the support body 420 may be crescent-shaped having a curvature center C. The support body 420 further includes a coupling part 422, a free end part 424 and a contact part 426. The coupling part 422 of the support body 420 is coupled with the device main body 30. In at least one exemplary embodiment, the coupling part 422 may be formed directly with the device main body 30. However, the coupling part 422 may be coupled to the device main body 30 using, for example, a coupling means provided between the coupling part 422 and the device main body 30 to increase a coupling force between the support unit 400 and the device main body 30. The coupling means may include, but is not limited to, a bracket, a screw, a fastener and/or adhesive. Further, in at least one exemplary embodiment, the device main body 30 may be coupled to the coupling part 422 such that a lower edge 32 of the main device body 30 extends to the curvature center C of the support body 420.

The free end part 424 is provided in a region of the body 420 opposite and below the coupling part 422. The free end part 424 may be disposed between a first guide rail 620 and a second guide rail 640 of the guide rail 600, which will be described further below. The contact part 426 connects the coupling part 422 and the free end part 424 and surface-contacts the guide rail 600 to slide thereon.

The rolling support part 440 extends from the contact part 426, and contacts a guide roller 660 of the guide rail 600 to rock the support body 420 back and forth, which will be described in greater detail below. That is, the rolling support part 440 is guided by the guide roller 660 to provide a rocking movement to the support body 420, thereby enhancing the sliding ability of the support unit 400 with respect to the guide rail 600.

On the other hand, a frictional resistance is generated due to the contact between the body 420 and the rolling support part 440 of the support unit 400 and the guide rail 600. This frictional resistance assists in balancing the load of the device main body 30 in cooperation with the elastic force of the elastic unit 800.

According to an exemplary embodiment, the guide rail 600 includes the first guide rail 620, the second guide rail 640, and guide rollers 660. The guide rail 600 is supported by a portion of the support unit 400 and guides the reciprocating movement of the support unit 400. The guide rail 600 is disposed as a pair to be spaced from each other along the X directional axis. Each guide rail 600 supports a respective opposite side end part 428, 430 of the support unit 400. A section of the guide rail 600 has a curvature corresponding to the shape of the support unit 400. As the section of the guide rail 600 corresponds to the shape or curvature of the support unit 400, the reciprocation of the support unit 400 may be effectively guided without interference.

The first guide rail 620 is coupled with the base member 200 on a first side thereof, and supports the contact part 426 of the support unit 400 on a second side thereof. The first guide rail 620 supports the bottom surface of the support unit 400 along the Z directional axis. Here, the first guide rail 620 may be installed on the sub base part 244 of the second base member 240.

The second guide rail 640 is coupled with the first guide rail 620 with the contact part 426 of the support unit 400 being disposed therebetween, and guides the reciprocating movement of the support unit 400. That is, the second guide rail contacts the upper surface of the support unit 400 along the Z directional axis to guide the reciprocating movement of the support unit 400.

The first guide rail 620 and the second guide rail 640 are coupled with each other to support a respective opposite side end part 428, 430 of the support body 420. Accordingly, the support unit 400 may be prevented from becoming detached, while the guide rails 600 guide the reciprocating movement of the support unit 400. In addition, between the first guide rail 620 and the second guide rail 640 is formed an accommodating part (not shown) which accommodates a respective guide roller 660.

Each guide roller 660 is disposed between respective first and second guide rails 620, 640 to guide the reciprocating movement of the support unit 400. As described above, the guide roller 660 contacts the rolling support part 440 of the support unit 400 to rock the support body 420, thereby enhancing the reciprocating ability of the support unit 400.

The elastic unit 800 includes an elastic member 820, a support member 840, a connection member 860 and a roller member 880. The elastic unit 800 is coupled with the support unit 400 and provides an elastic force to maintain the tilting position of the device main body 30 when the device main body 30 reciprocates between the upright position and the tablet position.

For example, the support unit 400 realizes a load while supporting the device main body 30. The elastic unit 800 applies a counterforce in a predetermined direction, i.e., the elastic force, to the support unit 400. Here, the predetermined direction refers to a direction in which the device main body 30 is forced toward the upright position, that is, a direction opposite to the load of the device main body 30. Accordingly, the elastic force from the elastic unit counteracts the load from the device main body 30. Therefore, the device main body 30 may be maintained in a tilting position, as described in greater detail below.

The elastic member 820 provides the elastic force, which forces toward the device main body 30 toward the upright position, and counteracts the load realized by the support unit 400. Accordingly, the device main body 30 may maintain a tilting position set by a user.

In at least one exemplary embodiment illustrated in FIGS. 3-6, the elastic member 820 includes a compression spring. In this case, the elastic member 820 may be disposed along the X direction. In response to being extended, the elastic member may apply an elastic force in the –X direction. The elastic force may be transferred to the support unit 400 and realized by the device main body 30, to maintain the tilting position of the device main body 30, as discussed further below.

The elastic member 820 may also include, but is not limited to, a tension spring or a plate spring as long as the spring provides an elastic force to the device main body 30 to maintain the tilting position thereof.

The support member 840 is provided to support the elastic member 820 to the sub base part 244. In at least one exemplary embodiment, the support member 840 may be disposed on the rear side of the display section 10 to support the elastic member 820. In this way, as the support member 840 is disposed on the rear side of the display section 10, the elastic unit 800 is not exposed to the user, thereby enhancing design characteristics.

At least one connection member 860 connects the support unit 400 and the elastic member 820 to transfer the elastic force from the elastic member 820 to the support body 420. Accordingly, an amount of elastic force applied to the support unit 400 may be based on the reciprocating movement of the support body 420.

According to at least one exemplary embodiment, the connection member 860 includes a first connection member 862 and a second connection member 864. The connection member 860 may include, but is not limited to, a wire.

The first connection member 862 and the second connection member 864 are connected to the free end 424 of the support body 420, and are disposed adjacent to opposing side end parts of the support unit 400. Alternatively, the first and second connection members 862, 864 may be connected directly outer sides a respective opposite side end part 428, 430 of the support body 420. Accordingly, a predetermined distance exists between the first and second connection members 862, 864. As the first connection member 862 and the second connection member 864 are connected to respective opposite side end parts 428, 430 of the support unit 400 with the predetermined distance existing therebetween, an eccentric deviation of the support unit 400 may be prevented. In this way, the first connection member 862 and the second connection member 864 respectively moves to prevent the eccentric deviation of the support unit 400. That is, when the device main body 30 tilts from the upright position to the tablet position, the first and second connection members 862,864 move, thereby expanding the elastic member and increasing the elastic force in the Y direction. On the other hand, when the device main body 30 tilts from the tablet position to the upright position, the elastic forces transferred by the first and second connection members 862 and 864 is reversed, and decreases respectively in comparison with the former.

The roller members 880 are disposed adjacent to the opposite side end parts 428, 430 of the support body 420 and guide the movements of the first and second connection members 862 and 864 when the first and second connection members 862 and 864 move according to the tilting of the device main body 30. The roller members 880 include a first roller member 882 which guides the first connection member 862 and a second roller member 884 which guides the second connection member 864, which are respectively disposed adjacent to the opposite side end parts 428, 430 of the support body 420.

Figure 7:
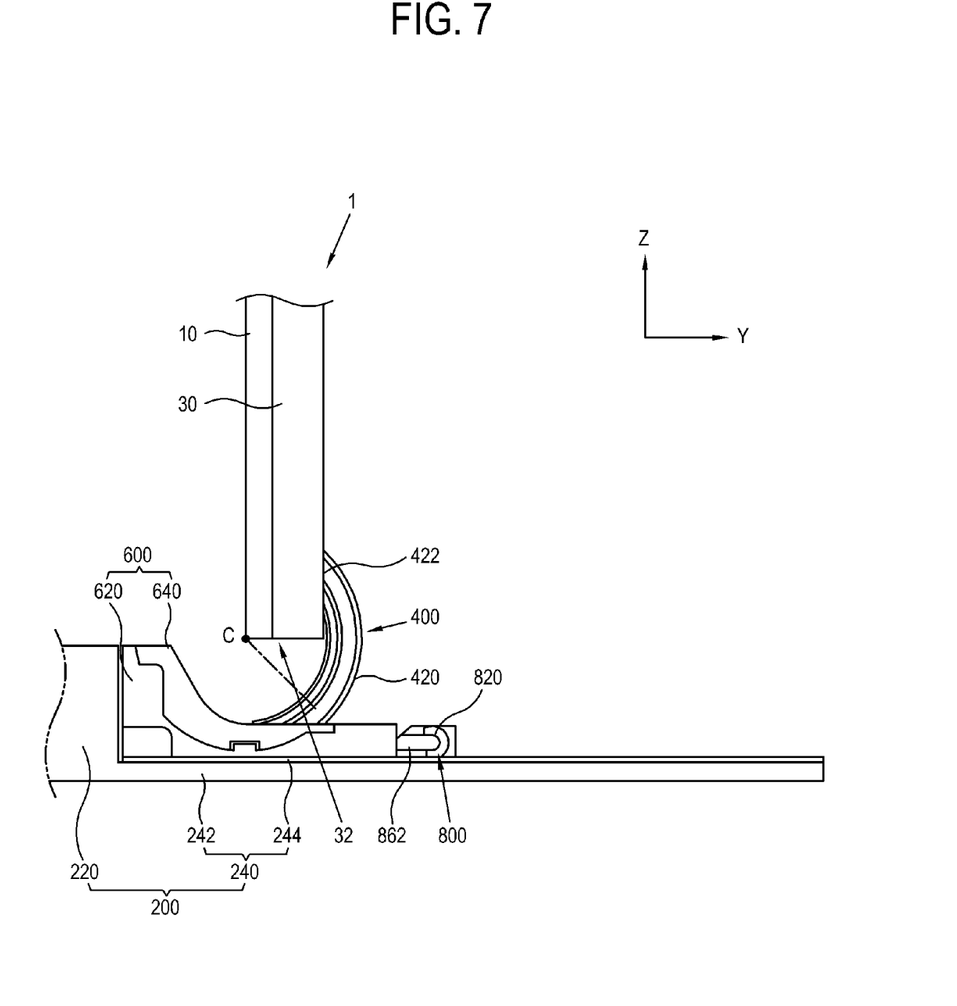
FIG. 7 is a side view illustrating a compute device according to an exemplary embodiment, in an upright position.
Figure 8:
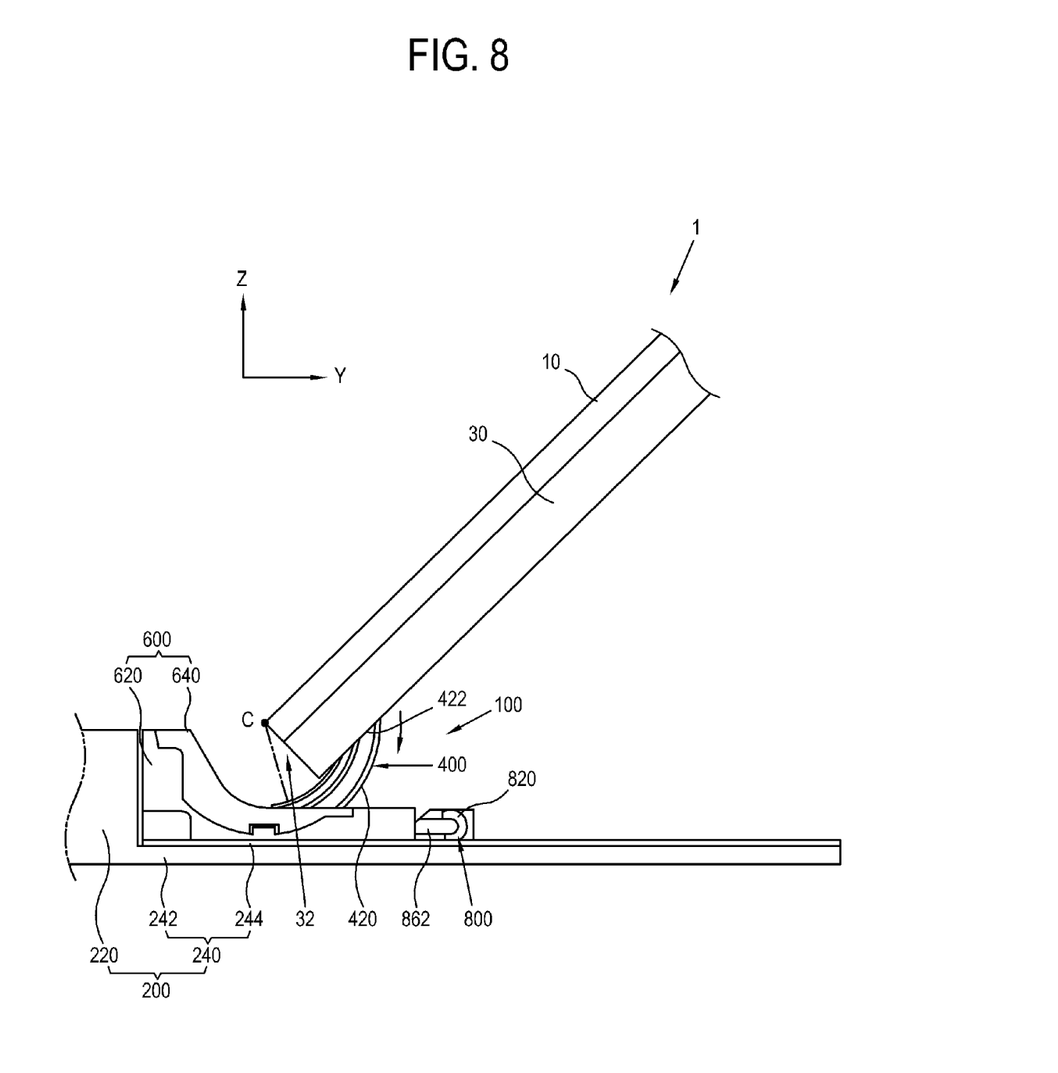
FIG. 8 is a side view illustrating a computer device according to an exemplary embodiment, in a tilting state between an upright position and a tablet position.
Figure 9:
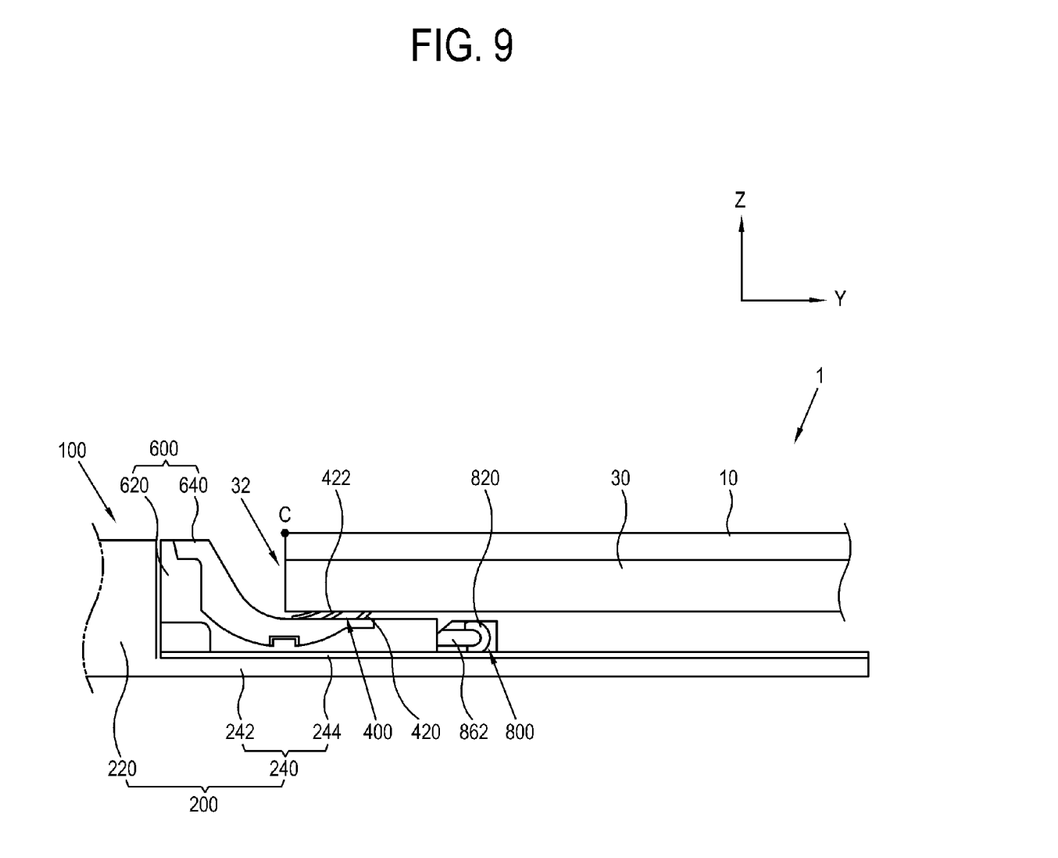
FIG. 9 is a side view illustrating a computer device according to an exemplary embodiment, in a tablet position.

FIG. 7 is a side view illustrating a compute device in an upright position according to an exemplary embodiment. FIG. 8 is a side view illustrating the computer device in a tilting state between the upright position and the tablet position according to an exemplary embodiment. FIG. 9 is a side view illustrating the computer device in the tablet position according to the exemplary embodiment.

Hereinafter, the computer device 1 according to an exemplary embodiment illustrated in FIGS. 7-9 will be described in detail.

Referring to FIG. 7, when the device main body 30 is in the upright position, the elastic unit 800 does not provide an elastic force. In this regard, the rotational center of the device main body 30 constantly coincides with the curvature center C of the support body 420.

Secondly, when the device main body 30 is in the tilting state between the upright position and the tablet position as shown in FIG. 8, the device main body 30 and the support unit 400 rotate with respect to the curvature center C. At this time, the elastic member 820 of the elastic unit 800 extends to generate the elastic force realized by the device main body 30 toward the upright position to balance the load of the device main body 30. Accordingly, the device main body 30 may maintain a tilting position between the upright position and the tablet position.

Referring to FIG. 9, when the device main body 30 is in the tablet position, the elastic force of the elastic unit 800 is at a maximum to balance the load of the device main body 30, so that the device main body 30 may maintain the tablet position. Accordingly, while in the tablet position, the device main body 30 is parallel with the base member 200 such that the device main body 30 is flush with the first base member 220.

Although a few exemplary embodiments of the present general inventive concept have been shown and described, it will be appreciated by those skilled in the art that changes may be made in these exemplary embodiments without departing from the principles and spirit of the present general inventive concept, the scope of which is defined in the appended claims and their equivalents.

What is claimed is:

1. A support assembly to support a computer device main body having a display section, comprising:
    a base member disposed on an installation surface;
    a support unit, having a predetermined curvature, that is coupled with the computer device main body on one side thereof, and that reciprocates according to a tilting movement of the computer device main body between an upright position that positions the computer device main body upright with respect to the installation surface and a tablet position that positions the computer device main body in parallel with the installation surface;
    a guide rail that is coupled with the base member on a first side thereof and that is supported by a portion of the support unit on a second side thereof, to guide the reciprocation of the support unit; and
    an elastic unit that is coupled to the support unit to provide an elastic force that maintains a tilting position of the computer device main body when the computer device main body tilts between the upright position and the tablet position,
    wherein the computer device main body moves along the predetermined curvature during the tilting movement.

2. The support assembly according to claim 1, wherein the elastic unit comprises:
    an elastic member to provide the elastic force to maintain the tilting position of the computer device main body; and
    a connection member, coupled to the support unit and the elastic member, to transfer a pressing force to the elastic member in response to the reciprocation of the support unit.

3. The support assembly according to claim 2, wherein the elastic member provides the elastic force to the computer device main body toward the upright position to balance a load of the computer device main body supported by the support unit.

4. The support assembly according to claim 2, wherein the connection member includes first and second connection members each being coupled to opposite side end parts of the support unit, and the first and second connection members transferring the pressing force in different directions in response to the reciprocation of the support unit.

5. The support assembly according to claim 4, wherein the elastic unit further comprises roller parts that are respectively disposed adjacent to the opposite side end parts of the support unit and guide a reciprocal movement of the first and second connection members.

6. The support assembly according to claim 1, wherein the guide rail comprises:
    a pair of first guide rails which is coupled with the base member on a first side thereof and is supported by opposite side end parts of the support unit on a second side thereof; and
    a pair of second guide rails which is respectively coupled with the pair of first guide rails with the support unit being disposed therebetween and guides the reciprocation of the support unit.

7. The support assembly according to claim 6, wherein sections of the first and second guide rails which contact the support unit respectively have curvatures corresponding to the predetermined curvature of the support unit.

8. The support assembly according to claim 6, wherein the guide rail further comprises a first guide roller disposed between the two first guide rails and a second guide roller disposed between the two second guide rails, and guides the reciprocation of the support unit.

9. The support assembly according to claim 8, wherein rolling support parts are respectively formed on the opposite side end parts of the support unit to rolling-contact the guide rollers.

10. The support assembly according to claim 1, wherein a rotational center of the computer device main body coincides with a curvature center of the support unit.

11. The support assembly according to claim 1, wherein the base member comprises:
    a first base member; and
    a second base member disposed at a height lower than the first base member, the second base member coupled to the guide rail and the elastic unit.

12. The support assembly according to claim 11, wherein the computer device main body has a rectangular plate shape in which the display section is installed on a front side thereof, and
    wherein the height difference between the first base member and the second base member is set so that upper surfaces of the first base member and the display section have substantially the same heights when the computer device main body is in the tablet position.

13. A computer device comprising:
    a computer device main body in which a display section is installed on a front side thereof; and
    a support assembly which supports the computer device main body to be able to tilt with respect to an installation surface of the computer device main body between the upright position and the tablet position, comprising:
        a support unit, having a predetermined curvature, that is coupled with the computer device main body at one side thereof, and that reciprocates according to a tilting movement of the computer device main body between an upright position in which the computer device main body stands upright with respect to the installation surface and a tablet position in which the computer device main body is disposed in parallel with the installation surface,
    wherein the computer device main body moves along the predetermined curvature during the tilting movement.

14. The computer device according to claim 13,
    wherein the support assembly comprises:
    a base member which is supported on the installation surface;
    a guide rail which is coupled with the base member on a first side thereof and is supported by a part of the support unit on a second side thereof, to guide the reciprocation of the support unit; and
    an elastic unit which is connected to the support unit and provides an elastic force to maintain a tilting position of the computer device main body when the computer device main body tilts between the upright position and the tablet position.

15. The computer device according to claim 14, wherein the elastic unit comprises:
   an elastic member which provides the elastic force to maintain the tilting position of the computer device main body; and
   first and second connection members coupled to the support unit and the elastic member to provide a pressing force to the elastic member in response to the reciprocation of the support unit.

16. The computer device according to claim 15, wherein the elastic member provides the elastic force to the computer device main body toward the upright position to balance a load of the computer device main body supported by the support unit.

17. The computer device according to claim 15, wherein the elastic unit further comprises roller parts which are respectively disposed adjacent to opposite side end parts of the support unit and guide a reciprocal movement of the first and second connection members.

18. The computer device according to claim 14, wherein the guide rail comprises:
   a pair of first guide rails coupled to the base member on a first side thereof and supported by opposite side end parts of the support unit on a second side thereof; and
   a pair of second guide rails each coupled to the respective first guide rail,
   wherein the each second guide rail supports the respective opposite end parts of the support unit to guide the reciprocation of the support unit.

19. The computer device according to claim 18, wherein the guide rail further comprises a first guide roller disposed between the pair of first guide rails and a second guide roller disposed between the pair of second guide rails to guide the reciprocation of the support unit.

20. The computer device according to claim 19, wherein rolling support parts are respectively formed on the opposite side end parts of the support unit to rolling-contact the guide rollers.

* * * * *